G. BRAIN.
DIPPING FRAME FOR CANDIES.
APPLICATION FILED APR. 28, 1911.

1,019,220.

Patented Mar. 5, 1912.

WITNESSES
George Bambag.
Wm. F. Hickel

INVENTOR
George Brain
BY Munn & Co
ATTORNEYS

UNITED STATES PATENT OFFICE.

GEORGE BRAIN, OF NEW YORK, N. Y.

DIPPING-FRAME FOR CANDIES.

1,019,220.　　　　Specification of Letters Patent.　　Patented Mar. 5, 1912.

Application filed April 28, 1911. Serial No. 623,809.

*To all whom it may concern:*

Be it known that I, GEORGE BRAIN, a citizen of the United States, and a resident of the city of New York, Long Island City, borough of Queens, in the county of Queens and State of New York, have invented a new and Improved Dipping-Frame for Candies, of which the following is a full, clear, and exact description.

My invention is an improved dipping frame for the purpose of applying chocolate and other coatings to candies, and it comprises means for forming a series of pockets in which the bodies of the candies to be coated are placed before the same are dipped, together with novel means for displacing the candies from the pockets after dipping and coating the same, and at the same time impressing upon the coatings a figure of any desired shape.

Reference is to be had to the accompanying drawings forming a part of this specification, in which the same characters of reference indicate the same parts in all the views.

Figure 1:
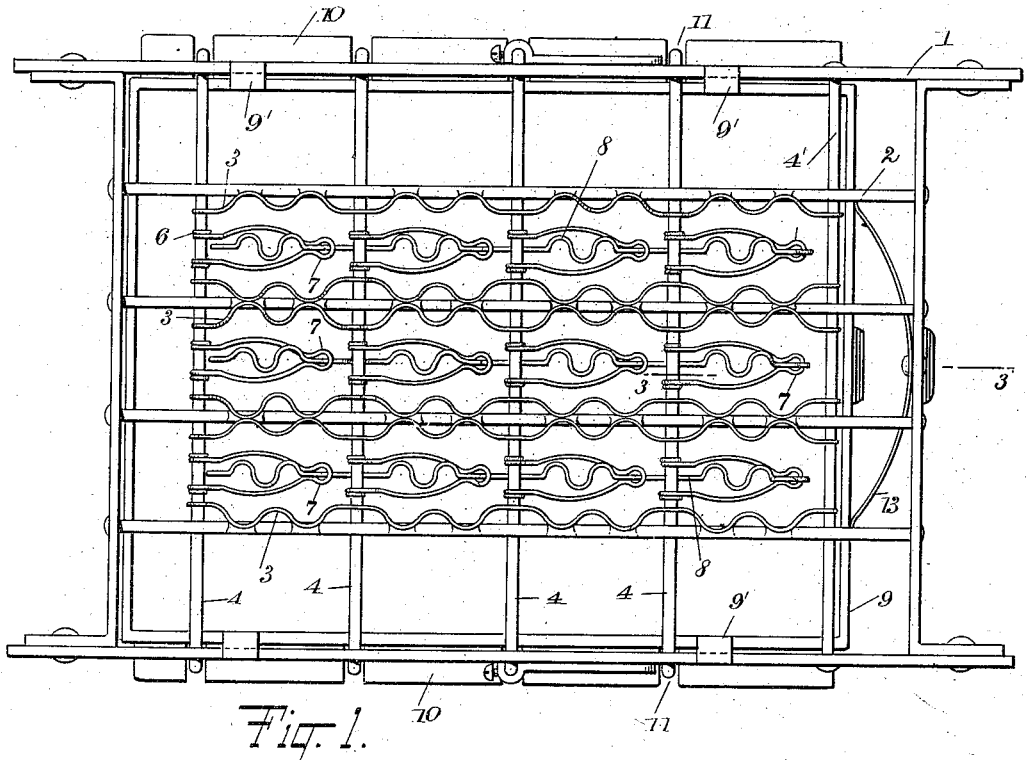
Figure 2:
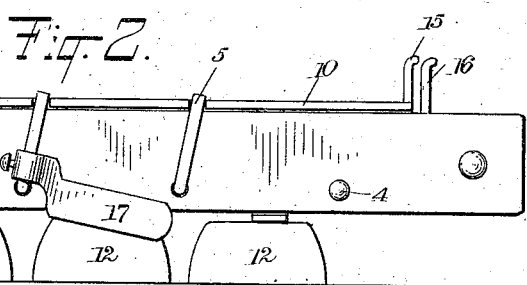
Figure 3:
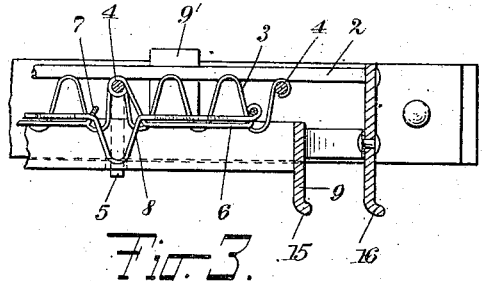
Figure 4:
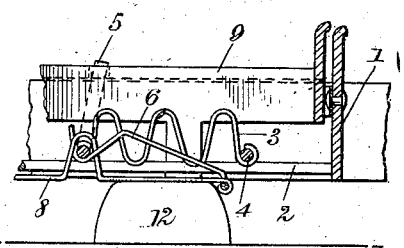

Figure 1 is a plan view of my improved dipping frame; Fig. 2 is a side elevation of the same in inverted position; Fig. 3 is a section on the line 3—3 of Fig. 1, with the frame in dipping position; and Fig. 4 is a view similar to Fig. 3, with the frame in inverted position, showing the parts in the act of delivering the coated candy upon a board or panel.

My improved dipping device comprises a rectangular frame 1, the ends of which support a suitable number of parallel longitudinal bars 2. To each of the bars 2 is attached a pair of bent wire sections 3, each of these wire sections being bent into zigzag shape, as shown on Figs. 3 and 4, and being secured one on each side of the bars 2 by soldering the same along the upper ends of the zigzag sections. A series of transverse bars 4 is also mounted in the frame 1, these bars pivotally engaging the sides of the frame and having laterally bent arms 5 at their ends outside of the frame 1. One end of each of the wires 3 is looped around the bar 4 at the left end of the frame, and the opposite ends of the wires 3 are looped around a stationary transverse bar 4' carried by the frame 1, at its opposite end.

The rectangular spaces inclosed between the transverse bars 4 and the bars 2, as shown on Fig. 1, form the outlines of pockets for each of the candies to be coated, the sides of these pockets consisting of the downwardly-bent portions of the wire sections 3. The bottoms of these pockets are formed by wire loops 6, the ends of which are looped tightly around the transverse bars 4, each of these loops having an aperture or bearing 7 at its outer end. Through these apertures or bearings 7 pass strips of wire 8, these wires being bent in the form of a curved broken line, adjacent the loops 6, as shown on Fig. 1, and having straight portions adjacent the ends of each of the loops which pass loosely through the bearings 7. The right-hand extremities of the wires 8 in the position of the parts shown on Fig. 1, are all pivotally attached to the bearing ends of the loops 6 of the pockets at the right-hand end of the frame 1, and the curved portions of the strips 8 lie in the bottoms of each of the pockets in which the candies are placed.

As shown on Fig. 1, the pockets are arranged in longitudinal rows from one end of the frame to the other, and each of the strips 8 passes continuously from one end of the frame to the other, coöperating with the bottom of each of the pockets in the longitudinal row for which it is used. When the bars 4 are rotated the loops 6 will be caused to rotate with the bars on account of the fact that the ends of the wire forming these loops are rigidly attached to the bars, and the wires 8 will be caused to move by these loops away from the bottom of the pockets in which they are located, so as to release the candy bodies from the pockets when the operation of coating is finished.

9 is a rectangular frame mounted to slide inside of the frame 1, and having along its sides a pair of outwardly extending flanges 10 which overlap the bottom edges of the frame 1. These flanges 10 have notches 11 to engage the laterally-bent arms 5 of the bars 4, and attached to the frame 9 are clips or guides 9', the ends of which are bent over the opposite edges of the sides of the frame 1, so as to hold the frame 9 in place. These members 9' permit the frame 9 to slide back and forth in the frame 1 without becoming separated from the outer frame.

Normally, the inner frame 9 is held in such a position by a spring 13 placed between the adjacent ends of the frames 9 and 1, that the arms 5 will be held in a position substantially perpendicular to the plane of these two frames, so as to keep the loops 6 along with the wires 8 in position to form the bottom of the pockets receiving the bodies of the candies. Carried by the ends of these two frames adjacent the spring 13 is a pair of projections 15 and 16, which can be pressed together by hand to give the inner frame a relative movement in the outer frame. An arm 17 may be provided on the side of the outer frame and engage one of the laterally-bent arms 5 to operate the inner frame by suitable mechanism if desired.

When the dipping device is in use, the candy bodies, which are indicated by the numeral 12, will be placed in the pockets formed by the construction above described, in such a position that the crown of each of the candies will rest upon the curved portions of the wires 8, and the bottoms of the candies will be substantially flush with the top of the frame 1. At this time the frame will be held in such position that the lugs 15 and 16 will be turned downward, as shown on Fig. 3, and the loops 6 and wires 8 will be substantially flush with the lower ends of the zigzag wires 3 forming the sides of the pockets. The frame is then dipped into the chocolate or other fluid coating mixture until all the candy bodies are immersed, the operation of dipping being performed by hand, or the frames 1 and 9 and the other parts may be mounted in a suitable machine designed for this purpose, if desired, and the device is then lifted out of the mixture and turned over to occupy the position shown in Fig. 2. The lugs 15 and 16 are then pressed together by hand, moving the frame 9 longitudinally in the frame 1 and causing the flanges 10 to rotate the bars 4 by means of the arms 5. This will rotate the loops 6, and these loops in their movements will move the wires 8 away from the bottoms of the pockets in which the candy bodies are placed, displacing the same and delivering them upon a board or panel to be dried. Before the wires 8 are moved away from the candy bodies 12, the curved portions thereof adjacent to each of the loops 6 will be pressed upon the coating on the crown of the candy, forming the imprint of the desired pattern. For example, I may bend the wire 8 adjacent each of the loops 6 into a monogram containing the initials of the manufacturer, or I may make this wire straight if desired, to cause the imprint on the candies to be the same as the candies which are fork-dipped by hand. The frame 1 can, of course, be made large enough to contain any number of pockets to receive the candies; and in addition to being operated by machinery to dip the candies and afterward invert the frame, suitable automatic mechanism can also be provided to actuate the arm 17 to displace the candies after dipping, and at the same time make the required impression upon the crowns of the candies.

Having thus described my invention, I claim as new and desire to secure by Letters Patent:

1. A candy dipping and coating device comprising a suitable frame, means carried by said frame for forming one or more pockets to receive the bodies of the candies to be dipped, the bottoms of said pockets being movable, and means engaged by the movable bottoms of said pockets to be moved thereby to expel the candies from the frame after the operation of dipping is finished, and imprint a suitable design upon the coatings of the candies.

2. In a candy dipping and coating device, the combination of a suitable frame, means carried by said frame to form one or more pockets to receive the bodies of the candies to be dipped, the bottoms of said pockets being pivotally mounted in said frame, and means supported by said pivotally mounted bottoms and movable thereby to expel the candy bodies from the device after the operation of dipping is finished, and at the same time imprint a suitable design upon the coatings of the candies.

3. In a candy dipping and coating device, the combination of a relatively fixed frame and a relatively movable frame, longitudinal and transverse bars carried by said relatively fixed frame, said bars forming the outlines of one or more pockets to receive the bodies of the candies to be dipped and coated, means for forming the bottoms of said pockets, said means being pivotally mounted on said bars, means carried by the relatively movable frame for actuating said bottoms, and means supported by said pivoted bottoms and movable therewith to expel the candy bodies from the device when the operation of coating is finished, and at the same time imprint a suitable design upon the coatings formed on the candies.

4. In a candy dipping and coating device, the combination of a relatively fixed and a relatively movable frame, fixed longitudinal bars and rotatable transverse bars carried by said relatively fixed frame, said rotatable bars having laterally bent arms at their outer ends, means carried by the relatively movable frame for engaging the said laterally bent arms, said fixed and transverse bars forming the outlines of pockets to receive the candies to be dipped, movable bottoms for said pockets fixed to the rotatable transverse arms to be moved therewith, and means carried by said movable bottoms and operable therewith to expel the candies from the pockets after dipping, and at the same time imprint a suitable design thereon, whereby, when the relatively movable frame is actuated the transverse bars will be rotated to move the bottoms and the expelling and imprinting means connected therewith.

5. A candy dipping and coating device consisting of an outer fixed frame and an inner movable frame, guiding means connecting the said frames together, longitudinal fixed bars and rotatable transverse bars mounted in the fixed frame, said transverse bars having laterally bent arms at their ends engaged by the movable frame to be rotated thereby, said fixed and transverse bars forming the outlines of pockets to receive the candies to be dipped, means for forming the sides of said pockets carried by the longitudinal bars, means for forming the bottoms of said pockets fixed to the rotatable bars to be moved therewith, and means carried by said movable bottoms and coöperating with a plurality of said pockets in a row to be moved by said bottoms, said means having a suitable shape to imprint a design upon said candies, whereby, after the operation of dipping is finished, the device can be inverted and the movable frame actuated to rotate the transverse arms and cause the movable bottoms and the imprinting means carried thereby to expel the candies from the pockets and imprint a design upon the coatings formed thereon.

6. A candy dipping and coating device comprising a suitable frame, means carried by said frame for forming one or more pockets to receive the bodies of the candies to be dipped, the bottoms of said pockets being movable, and means engaged by the movable bottoms of said pockets to be moved thereby to expel the candies from the frame after the operation of dipping is finished.

7. A candy dipping and coating device comprising a suitable frame or support, and means carried by said frame or support for forming one or more pockets to receive the bodies of the candies to be dipped, the bottoms of each of said pockets having means movable with the said bottoms to expel the candies from the frame after the operation of dipping is finished, and imprint a suitable design upon the coatings of the candies.

In testimony whereof I have signed my name to this specification in the presence of two subscribing witnesses.

GEORGE BRAIN.

Witnesses:
JOHN H. R. HARTJÉ,
GUSTAV HARMS, Jr.

---

Copies of this patent may be obtained for five cents each, by addressing the "Commissioner of Patents, Washington, D. C."